(12) United States Patent
Cochran et al.

(10) Patent No.: US 6,235,666 B1
(45) Date of Patent: May 22, 2001

(54) GREY GLASS COMPOSITION AND METHOD OF MAKING SAME

(75) Inventors: Gary Seldon Cochran, Eighty-Four; Anthony Vincent Longobardo, Mt. Pleasant; Ksenia Alexander Landa; Leonid Mendel Landa, both of Jeannette, all of PA (US)

(73) Assignee: Guardian Industries Corporation, Auburn Hills, MI (US)

( * ) Notice: Subject to any disclaimer, the term of this patent is extended or adjusted under 35 U.S.C. 154(b) by 0 days.

(21) Appl. No.: 09/277,749

(22) Filed: Mar. 29, 1999

(51) Int. Cl.⁷ .................. C03C 3/087; C03C 3/095; C03C 4/02; C03C 6/04
(52) U.S. Cl. .............. 501/64; 501/27; 501/31; 501/65; 501/66; 501/70; 501/71; 65/27
(58) Field of Search .................. 501/65, 66, 64, 501/70, 71, 72, 27, 31; 65/27

(56) References Cited

U.S. PATENT DOCUMENTS

| | | |
|---|---|---|
| 1,634,182 | 7/1927 | Gell et al. . |
| 2,099,602 | 11/1937 | Fischer . |
| 2,691,599 | 10/1954 | Blau . |
| 2,701,208 | 2/1955 | Blau . |
| 2,805,166 | 9/1957 | Löffler . |
| 3,652,303 * | 3/1972 | Janakarama-Rao .................. 501/70 |
| 3,663,474 | 5/1972 | Lee et al. . |
| 3,941,605 | 3/1976 | Yamashita . |
| 3,959,171 | 5/1976 | Woodcock . |
| 3,960,754 | 6/1976 | Woodcock . |
| 4,101,705 | 7/1978 | Fischer et al. . |
| 4,686,196 | 8/1987 | Gliemeroth . |
| 4,769,347 | 9/1988 | Cook et al. . |
| 5,036,025 | 7/1991 | Lin . |
| 5,039,631 | 8/1991 | Krashkevich . |
| 5,061,659 | 10/1991 | Ciolek et al. . |
| 5,190,896 | 3/1993 | Pucilowski et al. . |
| 5,206,189 | 4/1993 | Caldwell . |
| 5,219,805 | 6/1993 | Yoshida et al. . |
| 5,262,365 | 11/1993 | Oyobe et al. . |
| 5,263,858 | 11/1993 | Yoshida et al. . |
| 5,264,400 | 11/1993 | Nakaguchi et al. . |
| 5,318,316 | 6/1994 | Nakaguchi et al. . |
| 5,364,820 | 11/1994 | Morimoto et al. . |
| 5,380,685 | 1/1995 | Morimoto et al. . |
| 5,411,922 * | 5/1995 | Jones ................................ 501/71 |
| 5,413,971 | 5/1995 | McPherson . |
| 5,420,080 | 5/1995 | Wang et al. . |
| 5,446,007 | 8/1995 | Krashkevich et al. . |
| 5,569,630 * | 10/1996 | Landa et al. .................. 501/64 |
| 5,798,306 | 8/1998 | Dickinson, Jr. . |
| 5,837,629 * | 11/1998 | Combes et al. .................. 501/70 |
| 5,858,869 * | 1/1999 | Nagashima et al. ............. 501/70 |
| 5,958,811 | 9/1999 | Sakaguchi et al. . |
| 6,114,264 | 9/2000 | Krumwiede et al. . |

FOREIGN PATENT DOCUMENTS

| | | |
|---|---|---|
| 0053324 | 5/1987 | (EP) . |
| 849 233 * | 6/1996 | (EP) . |
| 0738243 | 9/1998 | (EP) . |
| 2 682 372 * | 4/1993 | (FR) . |
| 2 325 927 * | 9/1998 | (GB) . |
| 53-085813 * | 7/1978 | (JP) . |
| 59003043 * | 1/1984 | (JP) . |
| 61-083645 * | 4/1986 | (JP) . |
| 4-280834 | 10/1992 | (JP) . |
| 07-109147 * | 4/1995 | (JP) . |
| 555061 * | 5/1977 | (SU) . |
| 95/13993 * | 5/1995 | (WO) . |

\* cited by examiner

*Primary Examiner*—David R Sample
(74) *Attorney, Agent, or Firm*—Nixon & Vanderhye, P.C.

(57) ABSTRACT

A high LTa, low UV and IR transmittance grey glass employing as its colorant portion iron ($Fe_2O_3$/FeO), erbium ($Er_2O_3$) and, optionally, titanium ($TiO_2$). Enhanced effects are achieved by forming separate prebatch mixes, one of which includes rouge, metallic Si (optional), SiO and sand, the other including the remainder of ingredients, which after separate formation are then admixed to form the final, overall batch.

33 Claims, 1 Drawing Sheet

GREY GLASS COMPOSITION AND METHOD OF MAKING SAME

FIELD OF THE INVENTION

This invention relates to grey glass compositions and methods of making same. More particularly, this invention relates to erbium-containing grey glass compositions having low light transmittance in the UV and IR range while, at the same time, having high light transmittance in the visible range, thus making such glasses suitable for use as windows and windshields in the automotive industry and architectural field, as well as, in certain embodiments, as eyeglass lenses.

BACKGROUND OF THE INVENTION

The automotive industry, for a number of years, has centered on the color grey, sometimes referred to as "neutral grey", as the aesthetic color of choice for automotive windows. At the same time, this industry, as well as the eyeglass art, have demanded that transmission in the UV and IR range of the light spectrum be minimized. This is also desirable at certain times in the architectural field. Governmental regulations in the automotive industry, moreover, simultaneously insist that the visible light transmittance be at least 70% or greater in certain, if not all, vehicular windows when provided by the original equipment manufacturer of the vehicle (e.g. GM, Ford, Chrysler etc., in the U.S.A.). A need is thereby created in these diverse industries for a glass which achieves these properties.

A glass window, windshield or other glass article is said to have the desirable color "grey", sometimes referred to as "neutral grey", if it manifests a dominant wavelength from about 435 nm, and preferably from about 470 nm, to less than about 570 nm, in combination with an excitation purity of less than about 4.5%. This, then, defines the meaning of the term "grey" as used herein. A still more preferred range of dominant wavelength, thus defining a more preferred "grey" as used herein, is about 480 nm–550 nm, and in like manner, a more preferred range of purity is about 0.2–4.5%. The appearance of such glass, thus defined, has been found to be of a truly "grey" color, rather than wandering into an objectionable hew of bronze, green or purple, or some other color. This "grey" color, as aforesaid, has found a unique demand in the automotive market, but it also has potential utility in the architectural and eyeglass markets as well.

At the same time that a true "grey" color is to be achieved, there is the usually required need to achieve rather strict levels of light transmission defined conventionally by:

LTa as visible light transmission,
UV as ultraviolet light transmission,
IR as infrared light transmission, and
$T_s$ as total solar transmission.

In order to specify the parameters of these characteristics, it is generally necessary to specify the thickness of the glass which is the subject of the measurement. As used herein, in this respect, the term "a nominal thickness of about 1 mm–6 mm," and in certain embodiments, "about 3 mm–4 mm" means that the characteristics of the glass are those experienced when the thickness of the actual glass under investigation is adjusted for that nominal thickness range. Such thickness ranges, in this respect, are generally recognized as conventional thicknesses for glass sheets made by the float glass process, as well as a recognized thickness range for the automotive industry.

When measured at the specified nominal thickness (e.g. 3.2 mm or 4 mm) the important characteristic of color achieved by this invention may be reported by the conventional CIE LAB technique (see U.S. Pat. No. 5,308,805). Such a technique is reported in CIE Publication 15.2 (1986) and ASTM: E 308-90 [Ill. C 2° observer].

"Luminous transmittance" (LTa) [2° observer] is a characteristic and term well understood in the art, and is used herein in accordance with its well known meaning [see U.S. Pat. No. 5,308,805]. This term is also known as Ill. A visible transmittance (380–780 nanometers inclusive), and its measurement is made in accordance with CIE Publication 15.2 (1986) and ANSI test method Z26.1.

"Total solar energy transmittance" ($T_s$) (300–2100 nm inclusive, integrated using Simpson's Rule at 50 nm intervals using Parry Moon Air Mass=2) is another term well understood in the art [see U.S. Pat. No. 5,308,805]. It is used herein according to this well known meaning. Its measurement is conventional and well known.

The terms, and characteristics, of "ultraviolet light transmittance" (% UV), "infrared energy transmittance" (% IR), "dominant wavelength" (DW) and "excitation purity" (i.e. % "purity", or Pe) are also well understood terms in the art, as are their measurement techniques. Such terms are used herein, in accordance with their well known meaning [see U.S. Pat. No. 5,308,805].

"Ultraviolet transmittance" (% UW) is measured herein using Parry Moon Air Mass=2 (300–400 nm inclusive, integrated using Simpson's Rule at 10 nm intervals). Such a measurement is well known in the art.

"Infrared transmittance" (% IR) is conventionally measured using Simpson's Rule and Parry Moon Air Mass=2 over the wavelength range 800–2100 nm inclusive at 50 nm intervals. Such a measurement is well known in the art.

"Dominant wavelength" (DW) is calculated and measured conventionally in accord with the aforesaid CIE Publication 15.2 (1986) and ASTM: E 308-90. Its calculation and measurement are also well known in the art. As used herein, therefore, the term "dominant wavelength" includes both the actual measured wavelength and, where applicable, its calculated complement.

"Excitation purity" (Pe or % "purity") is measured conventionally in accord with CIE Publication 15.2 (1986) and ASTM: E 308-90.

For automotive windows (including windshields) it is desirable that the glass have the following characteristics (when measured at a nominal thickness of about 3 mm–4 mm and preferably at about either 3.2 mm or 4 mm as the particular situation may require), and often in the ultimate product as well:

LTa, greater than about 70%
UV, less than about 42%, preferably less than about 38%
IR, less than about 37%, preferably less than about 28%
$T_s$, less than about 47%.

Generally speaking, the prior art has at times been able to meet these automotive requirements, including the achievement of the necessary, aesthetic "grey" color by using as the essential ingredients of the colorant portion in an otherwise conventional silicate glass composition (e.g. a typical soda-lime-silica float glass composition), a combination of cobalt admixed with one or more of selenium, nickel, and cerium, along with an essential amount of iron. In many instances this combination was thought critical to achieving both a grey color and the requisite light transmission properties, or at least a "neutral bronze color." See, for example, U.S. Pat. Nos. 4,101,705; 5,061,659; 5,264,400; 5,318,931; 5,380,685; and Japanese Patent JP4-280834.

Unfortunately, these prior art combinations often had various problems associated with them. For example, cerium, being a well known UV absorber when present in glass in its reduced form, $Ce^{3+}$, should be avoided for the following reason. Iron is conventionally introduced into glass in the form of $Fe_2O_3$, part of which should be reduced to FeO to achieve the requisite low IR transmittance value. Cerium, which is introduced into glass in the form of $CeO_2$, is known to oxidize divalent iron to trivalent iron either directly or by competition with any reducing agent present in the glass melt. Therefore, coexistence of iron oxide and cerium oxide will inevitably lead to a decrease in the concentration of FeO in the glass and thus will reduce its IR absorbing power.

The use of nickel in these prior art compositions presented the problem of nickel sulfide stones forming in the ultimate product. Selenium, furthermore, is difficult to retain in the glass during glass making. The loss of selenium created a difficulty in controlling the redox ratio in the glass, which ultimately adversely affected transmittance values. Without some, or all, of these aforesaid key ingredients, cobalt used by itself with the iron as the colorant portion of the glass composition, could not achieve the requisite combination of Lta and grey color as defined above.

Several attempts in the past have been made to employ the rare earth element erbium (reported conventionally as $Er_2O_3$, and used herein according to this conventional practice) as a colorant in automotive windows and other glass articles. For example, the aforesaid U.S. Pat. No. 5,264,400 reports the use of such an ingredient in glasses of both bronze and grey tinted colors. However, as reported therein, the use of cerium oxide is an essential ingredient in the composition.

As another example, the aforesaid Japanese Patent No. 280834 employs $Er_2O_3$ in a glass composition which is then said to have a "low thermal expansion coefficient." The glass employs from 10–20% $B_2O_3$ and thus is properly referred to as a borosilicate glass, rather than the more conventional soda-lime-silica glasses used in automotive windows. While stating, in effect, that cobalt and nickel are optional, and no use of Se or Ce is reported, the dominant wavelength reported is accordingly rather high, i.e. from 570–610 nm, or tending toward an objectionable bronze color, even at the lower wavelengths achieved, rather than achieving a true "grey" color as defined above.

Reference to the examples presented in this Japanese Patent '834, moreover, demonstrates that to achieve the lower range of wavelengths (e.g. the lowest reported in 578 nm) the total iron content had to be kept at a very low 0.25% and the excitation purity was a very high 14.2%. This leads to the conclusion that this patent does not achieve, nor does it teach how to achieve, a true "grey" glass which, through the use of a high level of iron in the colorant portion (rather than the low level of iron used), also simultaneously achieves low UV and IR and high LTa transmittances, along with a true "grey" color. Indeed, in those examples which do not use cerium or some other UV absorber, and with the low levels of iron employed in those examples achieving lower dominant wavelengths, it is to be presumed that unacceptably high IR and UV transmittance values are the result.

In view of the above, it is apparent that there exists a need in the art for a new glass composition which overcomes the above problems while achieving the requisite grey color and meets the other solar management requirements of the particular industry in which it is to be used. It is a purpose of this invention to fulfill this and other needs in the art which will become more apparent to the skilled artisan once given the following disclosure.

SUMMARY OF THE INVENTION

Generally speaking, this invention fulfills the above-described needs in the art by providing a unique glass composition, glass articles made therefrom, and a unique method of making the glass. In this respect, the unique glass compositions are comprised of a colorant portion consisting essentially of, by weight percent:

| Ingredient | Approximate Wt. % |
| --- | --- |
| $Fe_2O_3$ (total iron) | about 0.5–0.8% |
| FeO | about 0.1–0.25% |
| $Er_2O_3$ | about 0.5–3.0% |
| $TiO_2$ | about 0–1.0% | wherein the glass when measured at a nominal thickness of about 1 mm–6 mm, and preferably about 3 mm–4 mm (e.g. at 3.2 mm and 4 mm) has a dominant wavelength of from about 435 nm to less than about 570 nm and an excitation purity of less than about 4.5%.

In achieving (making) the above-described glasses having the aforesaid unique colorant portion it is preferred to include within the batch ingredients, and thus during glass formation, a reducing agent of one or more ingredients. In the practice of certain embodiments herein the reducing agent is comprised of (by weight of the batch) about 0.01–0.3 wt. % of silicon monoxide (SiO) and about 0–0.12 wt. % of metallic silicon (Si). In other embodiments the reducing agent may be selected from one or more conventional glass melt reducers such as sucrose, tin, carbon, or the like.

In this respect, it was heretofore known, as reported in U.S. Pat. No. 5,569,630 (issued to two of the inventors hereto) to use SiO as a reducing agent for the purpose of reducing cerium and obtaining a colorless TTV absorbing glass which was free of iron. In the present invention, the combination of two lower valency forms of silicon; namely, one agent (optional) in the form of metallic silicon ($Si^°$) powder, and the other, ($Si^{2+}$) in the form of silicon monoxide (SiO), is utilized for the purpose of reducing the ferric ion to the ferrous ion, thereby obtaining a true "grey" glass with the requisite low IR transmittance as well as low UV and high visible transmittances, but without the necessity of the use of cerium. Indeed, the preferred glasses of this invention are free of any cerium (except perhaps for an inadvertent trace amount in some instances). A distinct advantage of this combination of Si/Sio as the reducing agent is that during glass melting both agents are converted into $SiO_2$, i.e. the main component in the preferred silicate glass matrices employed herein, without the need to add any dopant or other residue to the glass.

In this respect, certain unique glass compositions as contemplated by this invention comprise by weight percent:

| Ingredient | Wt. % |
| --- | --- |
| $SiO_2$ | about 65–75 |
| $Na_2O$ | about 10–15 |
| CaO | about 1.5–15 |
| MgO | about 0–10 |
| $Al_2O_3$ | about 0–3 |
| $K_2O$ | about 0.1–1 |
| $SO_3$ | about 0.1–0.3 |
| $TiO_2$ | about 0–1.0 |
| $Fe_2O_3$ | about 0.50–0.80 |
| FeO | about 0.10–0.25 |
| $Er_2O_3$ | about 0.50–3.0 |
| $B_2O_3$ | about 0–12.0 |

In such compositions, it is preferred that they be substantially free of one or more of Ce, Co, Se and Ni. Most preferably the compositions are substantially free of all of these elements. By the term "substantially free" is meant that such an element does not exist in an amount greater than a "trace amount" (i.e. usually as an impurity) and is not purposely added to the mix. For the purposes of this invention the approximate upper limit for each element is as follows and below which the element is generally considered to be present only in a "trace amount". Most preferably, of course, the glass is entirely free of any measurable amount of such elements:

| Element | Wt. of Glass ("trace amount") |
|---|---|
| cerium | less than about 0.0020% |
| cobalt | less than about 0.0003% |
| nickel | less than about 0.0005% |
| selenium | less than about 0.0003% |

In such instances, where these limits are not exceeded, it may be said that such an element has no significant affect upon the relevant solar management properties of the glass, which, therefore, may be considered the true meaning of the term "trace amount" as used herein.

The term "consisting essentially of" is used herein, in its conventional way, to define the essential ingredients while eliminating from use above a trace amount, other colorants as described above (e.g. Co, Se, Ce, Ni) which would significantly affect the solar management properties of the glass if present.

While not essential to the practice of this invention, in theory this invention may be said to achieve its true "grey" color by recognizing (and utilizing) the known principle of color formation that an achromatic (grey) glass can be obtained by the interference of only two colors, blue and pink, which if properly done, is more appealing aesthetically (as a true "grey" color) than the so-called "grey" colors heretofore achieved with combinations of colorants such as Se, Co, and Ni in combination with the background of blue color given by the ferrous ion in the glass. In the present invention, the very pure hue of light blue (needed for the creation of true "grey") is obtained in the glass by the appropriate reduction of $Fe_2O_3$ to FeO (the IR absorber). This is accomplished by a properly balanced combination or amount of Si (optional) and SiO followed by the achromatization (i.e. "physical bleaching") to a true grey color as defined herein, brought about by the use of erbium oxide which provides the true pink color to create the requisite interference, resulting in the aesthetically pleasing grey color of the glass.

Further slight color correction and, if desired, further UV absorption may be achieved by the addition of titania. As noted above, $TiO_2$ is an optional colorant and thus its amount of about 0.0%–1.0% is included in this term to demonstrate that $TiO_2$ is contemplated as an affirmative colorant which optionally may be used above a trace amount.

The preferred glasses according to this invention generally exhibit, in combination, the following characteristics as measured at their intended nominal thickness:
  a) a true "grey" color as defined above;
  b) a high transmittance of visible light, with an Lta usually equal to or greater than about 70%;
  c) a low IR transmittance less than about 37% and preferably less than about 28%;
  d) a low UV transmittance less than about 42% and preferably less than about 38%; and
  e) a low total solar transmittance less than about 47%.

In the aforesaid U.S. Pat. No. 5,569,630 there is additionally disclosed the technique of using a multiple prebatch approach which employs the matrix components in one prebatch mix and a separate prebatch mix of $CeO_2$ and the reducing agent. In yet another aspect of this invention, a unique method of making the glasses of this invention has been discovered which draws upon the teachings in U.S. Pat. No. 5,569,630 to help achieve enhancement of such characteristics as reproducibility, optimized color, and further improved UV and IR transmittances. For example, by the use of such a method it has been found that the reproducible nature of the solar management properties achieved are optimized over ordinary techniques of mixing all ingredients together in a single batch and, thereafter, simply melting the batch to form a glass. Generally speaking, these unique methods for making the glasses of this invention, as above-described, comprise the steps of:
  a) forming at least two separate prebatch mixes which when mixed together form an overall batch mixture comprising:
    Ingredient
    sand
    iron oxide
    erbium oxide
    metallic Si
    SiO (silicon monoxide)
  wherein the first prebatch mix comprises (and preferably consists essentially of):
    Ingredient
    iron oxide
    metallic Si
    SiO (silicon monoxide)
    sand
  and wherein any remaining prebatch mix or mixes include the remaining ingredients in the overall batch mixture,
  b) mixing the first prebatch mix ingredients together separately from said remaining prebatch mix ingredients to form the first prebatch mix,
  c) mixing the remaining ingredients so as to form at least one other separate prebatch mix, thereafter,
  d) mixing the prebatch mixes together to form the overall batch mixture,
  e) melting the overall batch mixture to form a glass therefrom, and thereafter,
  f) forming the glass into the glass article.

This invention will now be described with respect to certain embodiments thereof, wherein:

IN THE DRAWINGS

DETAILED DESCRIPTION

Figure 1:
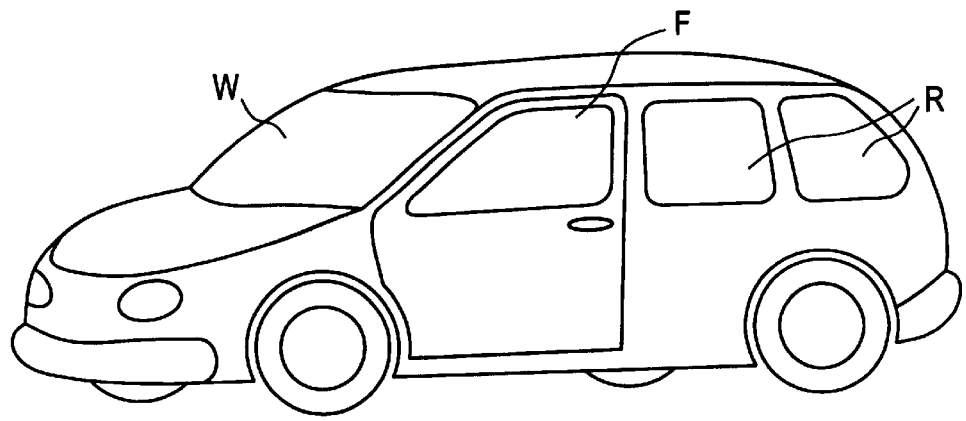
FIG. 1 is a side plan view of an automobile having windows and a windshield employing the glasses of this invention.
Figure 2:
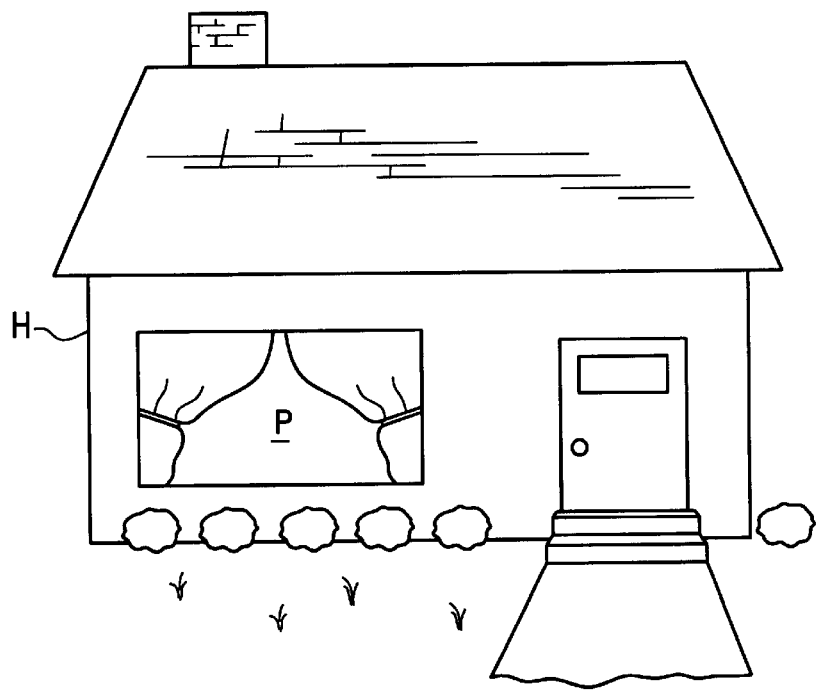
FIG. 2 is a front plan view of a dwelling having an architectural window made of the glasses of this invention.
Figure 3:
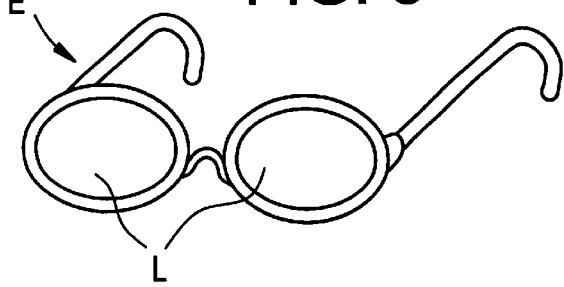
FIG. 3 is a perspective view of eyeglasses employing glass lenses according to this invention.

With reference to FIGS. 1–3 and as stated above, while the glasses of this invention find unique application in the automotive industry, they may also be used as flat glass for the architectural market for both single sheet windows and dual pane windows known as I.G. units. They may also be used as eyeglass lenses. Thus, in FIG. 1, windshield W, front side windows F and rear side windows R are illustrated for areas of use for the glasses of this invention. Rear windows (sometimes called "backlights") are also applicable, but are not shown for convenience. In FIG. 2 a typical house H is schematically shown with a conventional window P having a glass sheet or sheets (when an I.G. unit) formed of a glass according to this invention. In FIG. 3, eyeglasses E are provided with a pair of lenses L made of a glass according to this invention. In general, then, the glasses of this invention find utility wherever truly "grey" glasses having low UV and IR transmittances, as usually high LTa's, are desired or required.

The preferred glasses for use in this invention employ conventional soda-lime-silica flat glass as their base composition, to which is then added certain ingredients to make up a unique colorant portion. Of particular utility, in this respect, are the various soda-lime-silica glasses used in making glass sheets by the float process and generally represented, conventionally, on a weight percent basis, as comprised of the following basic ingredients:

| Ingredient | Wt. % |
| --- | --- |
| $SiO_2$ | 68–75 |
| $Na_2O$ | 10–18 |
| CaO | 5–15 |
| MgO | 0–5 |
| $Al_2O_3$ | 0–5 |
| $K_2O$ | 0–5 |

Other minor ingredients, including various conventional and refining aids, such as $SO_3$, may also be included. In the past, furthermore, it has been known to optionally include small amounts of BaO and $B_2O_3$. Preferably, the glasses herein include by weight about 10–15% $Na_2O$ and 6–12% CaO.

Prior to this invention one of the inventors hereto discovered and put into commercial practice the finding that by using a unique amount of $B_2O_3$ in combination with iron as a principal constituent in a colorant portion of a glass, $B_2O_3$ synergistically modified the absorption power of the ferrous and ferric iron, thereby achieving lower levels of UV, $T_s$ and IR transmittances than would otherwise be expected from such a relatively low amount of iron. This synergism is employed in certain embodiments of this invention as an enhancing factor to UV, IR and $T_s$ transmittances in order to minimize these transmittances without the use of cerium oxide or other known UV or IR absorbers. In certain other embodiments, small amounts of $TiO_2$ are optionally employed to further limit UV absorption.

The glasses of this invention, as stated above, achieve a true grey (or "neutral grey") color, as opposed to manifesting an objectionable "bronze", "blue grey" or "green grey" color. Such a true "grey" color is best defined, as aforesaid, by referring to the two characteristics of: (1) "dominant wavelength", and (2) "excitation purity." Also complementing this definition is reference to the aforesaid CIE LAB coordinates [Ill. C 2° observer]. According, then, to this invention, the glasses herein are true "grey" glasses because they have a dominant wavelength of from about 435 nm to less than about 570 nm, and most preferably between about 480 nm–550 nm; coupled with an excitation purity less than about 4.5% and preferably from about 0.2% to about 4.5%. Such glasses then will preferably also include the following CIE LAB color coordinates [Ill. C 2° observer] when measured at a nominal thickness of from about 1 mm–6 mm (and preferably for most uses, at about 3 mm–4 mm):

L* about 86–91
a* about –2.4 to +1.6
b* about –5.0 to +2.0.

Most preferably the CIE LAB color coordinates [Ill. C 2° observer] as measured at a nominal thickness of 3 mm–4 mm are:

L* about 87–89
a* about –0.5 to +1.0
b* about –3.0 to –1.0.

When used in the automotive market for windows and/or windshields that must conform to certain minimal visible light transmission properties (i.e. as measure as aforesaid as "Lta"), the glass articles of this invention will normally have an Lta at least equal to and preferably greater than about 70% and, in certain embodiments, greater than about 72%, and in still further instances, greater than 73%.

The glasses of this invention achieve the above unique characteristics, particularly, for example, in silicate glasses, and more particularly in glasses of the soda-lime-silica type as defined above, as well as in borosilicate glasses, by the use of a unique colorant portion which includes a relatively high amount of iron in combination with erbium oxide ($Er_2O_3$) and only, optionally, a small amount of $TiO_2$, to the exclusion of anything but, at most, trace amounts of Ce, Se, Co and Ni. As such, the colorant portions contemplated by this invention consist essentially of, by weight percent (of the total glass composition):

| Ingredient | Wt. % |
| --- | --- |
| $Fe_2O_3$ (as total iron) | about 0.5–0.8% |
| FeO | about 0.1–0.25% |
| $Er_2O_3$ | about 0.5–3.0% |
| $TiO_2$ | about 0.0–1.0% |

In certain preferred embodiments, the colorant portion of the glasses contemplated herein consist essentially of, by weight percent (of the total glass composition):

| Ingredient | Wt. % |
| --- | --- |
| $Fe_2O_3$ (as total iron) | about 0.6–0.8% |
| FeO | about 0.16–0.25% |
| $Er_2O_3$ | about 1.0–2.0% |

Most preferably such a colorant portion also includes 0.1–0.5% $TiO_2$. Moreover, while perhaps not classifiable as a "colorant," nevertheless, in certain preferred embodiments the glasses will also include about 0.25–2.0 weight % $B_2O_3$, and preferably about 0.25–1.0% weight % $B_2O_3$, thereby achieving the heretofore known synergistic enhancing effect discussed above, but without adversely affecting color.

Certain preferred glass compositions of this invention are generally classifiable as soda-lime-silica glasses, and in certain preferred embodiments include by weight percent about 10–15% $Na_2O$ and about 6–12% CaO. Still further embodiments include high levels of $B_2O_3$ up to about 12% by weight, and such glasses are then properly referred to as being in the borosilicate family of glasses.

Still further preferred glass compositions of this invention generally consist essentially of, by weight percent:

| Ingredient | Weight % |
| --- | --- |
| $SiO_2$ | about 65–75 |
| $Na_2O$ | about 10–15 |
| CaO | about 1.5–15 |
| MgO | about 0–10 |
| $Al_2O_3$ | about 0–3 |
| $K_2O$ | about 0.1–1 |
| $SO_3$ | about 0.15–0.25 |
| $TiO_2$ | about 0–1.0 |
| $Fe_2O_3$ | about 0.5–0.80 |
| FeO | about 0.10–0.25 |
| $Er_2O_3$ | about 0.50–3.0 |
| $B_2O_3$ | about 0–12.0 |

The glasses of this invention may be made from standard batch ingredients using well known glass melting and refining techniques once given the above final glass analysis. For example, if a single, conventional batch technique for melting is to be used, a typical batch example would be as follows, based upon a total of 100 parts by weight:

| Batch Ingredient | Parts by Wt. |
| --- | --- |
| sand | about 70–73 |
| soda ash | about 20–26 |
| dolomite | about 16–19 |
| limestone | about 5.5–6.8 |
| boric acid | about 0.5–21 |
| salt cake | about 0.2–0.7 |
| rouge ($Fe_2O_3$) | about 0.5–0.8 |
| titania | about 0.1–1.0 |
| erbium oxide | about 0.5–3.0 |
| Si (metal) | about 0.01–0.12 |
| SiO | about 0.02–0.3 |

As discussed briefly above, while conventional single batch melting techniques may be employed here, it is a unique finding, and thus an additional part of this invention, drawing upon the teachings in U.S. Pat. No. 5,569,630, that if certain multiple, prebatch mixing of selected ingredients is accomplished to make up separate "prebatch mixes", followed thereafter by admixing together these prebatch mixes to make up the final "overall batch mixture," certain quality enhancing characteristics in the final glass are achieved, principally in the ability to more precisely obtain in repeatable batches the optimal end result (characteristics) sought to be achieved, as well as enhanced solar management properties. In short, by this prebatch mix technique employing at least two prebatches of selected ingredients, reproducibility of optimized (i.e. maximized, or more precise) color, UV, IR, and LTa characteristics are achieved.

In this respect, one of the prebatch mixes should be made up of the iron-containing ingredient (e.g. rouge) along with SiO (silicon monoxide) and optionally, metallic Si (i.e. the reducing agents), and preferably some of the sand. In preferred embodiments the total amount of the iron (e.g. rouge), metallic Si, and SiO are used in this first prebatch mix with a small amount of sand and are thoroughly mixed together separately from the remaining batch ingredients. It is preferred that, for example, on the basis of a total of 70–73 parts of sand by weight per hundred in the overall batch, only about 5–13 parts of sand is used in this first prebatch mix.

The remaining batch ingredients can then be made up by admixing them in another separate prebatch mix or into two or more prebatch mixes before admixing them with the iron and reducing agent-containing first prebatch mix. In certain embodiments of this invention the remaining ingredients are formed into two additional prebatch mixes. The first additional prebatch mix (i.e. the second prebatch mix) is made up of a portion of the soda ash, and all the titania (if used) and the erbium oxide. The second additional prebatch mix (i.e. the third prebatch mix) is then made up of the remaining ingredients which thus normally includes the rest of the sand (e.g. 60–65 parts and preferably about 61.5 parts, per hundred) and soda ash, and all of the dolomite, limestone, boric acid and salt cake to be used in the final batch.

After each separate prebatch mix is thoroughly separately mixed, to form a substantially homogenous powdered admixture, the two or more prebatch mixes are then thoroughly mixed together to form the overall (or final) batch mixture. Conventional melting and refining techniques are then used to form a molten glass from which flat sheet glass or other articles may be formed.

It has been found that the use of at least two prebatch mixes, wherein the iron is isolated with the silicon monoxide (SiO) and metallic Si (if used), produces glasses of a much more predictable and often optimized nature as far as their color and other solar management properties go.

While not essential to the practice of this invention, it may be theorized that this multi-prebatch technique procedure of isolating and thoroughly mixing the iron, silicon monoxide and silicon metal in a separate prebatch mix leads to the formation of aggregates, or "clusters" in the batch, which form a "quasi-ingredient" of the batch. This quasi-ingredient then comprises all the "participants" (i.e. $Fe_2O_3$, SiO and Si "dissolved" in a small amount of sand) of the above-described reactions of reduction of ferric ion to ferrous ion by the two lower valence forms of silicon. By making up the quasi-ingredient from these reactants, the probability of their encounter is increased, thus increasing the completion of the chemical reactions in the melt, and resulting in glasses of a more predictable (reproducible) nature as far as their color and solar management properties go. The above reactions are also optimized in this quasi-ingredient (prebatch) approach for the amounts of the ingredients employed, thus providing a more effective use of SiO which is relatively expensive.

The following constitute examples of this invention:

EXAMPLES

Glass samples having the composition and properties shown in the TABLE below were formed from the ingredients listed in the first columns of this table, using the three prebatch mixing technique as described above. The ingredient listed as "$Fe_2O_3$" is total iron and was added as conventional rouge to the first prebatch which also included metallic silicon (when used), silicon monoxide, and a portion (5–13 parts per hundred) of the total sand. The second prebatch then included the erbium oxide, titania (when used), and about one-third of the total soda ash employed. The third prebatch included the remainder of the ingredients as listed. The three prebatch mixes were then mixed together to form the overall batch mixture.

The overall batch mixture was then melted in an electric furnace in a conventional crucible at a temperature in the range between 1480° and 1520° C. The molten glass was then cast into molds for measurement sampling (e.g. 2" diameter buttons), annealed at 620° C. for ½ hour and cooled to room temperature. The cooled glass was polished to prepare either 4 mm or 3.2 mm thick specimens which were then measured using conventional practices as described above.

TABLE

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
| --- | --- | --- | --- | --- | --- | --- | --- | --- | --- | --- | --- | --- |
| Sand | 71.50 | 71.50 | 71.50 | 71.50 | 71.50 | 71.50 | 71.50 | 71.50 | 71.50 | 71.50 | 71.50 | 71.50 |
| Soda ash | 23.70 | 23.70 | 23.70 | 23.70 | 23.70 | 23.70 | 23.70 | 23.70 | 23.70 | 23.70 | 23.70 | 23.70 |
| Potash | 0.00 | 0.00 | 0.00 | 0.00 | 0.00 | 0.00 | 0.00 | 0.00 | 0.00 | 0.00 | 0.00 | 0.00 |
| Alumina | 0.00 | 0.00 | 0.00 | 0.00 | 0.00 | 0.00 | 0.00 | 0.00 | 0.00 | 0.00 | 0.00 | 0.00 |
| Dolomite | 18.32 | 18.32 | 18.32 | 18.32 | 18.32 | 18.32 | 18.32 | 18.32 | 18.32 | 18.32 | 18.32 | 18.32 |
| Limestone | 6.10 | 6.10 | 6.10 | 6.10 | 6.10 | 6.10 | 6.10 | 6.10 | 6.10 | 6.10 | 6.10 | 6.10 |
| Boric acid | 0.89 | 0.89 | 0.89 | 0.89 | 0.89 | 0.89 | 0.89 | 0.89 | 0.89 | 0.89 | 0.89 | 0.89 |
| Salt cake | 0.50 | 0.50 | 0.50 | 0.50 | 0.50 | 0.50 | 0.50 | 0.50 | 0.50 | 0.50 | 0.50 | 0.50 |
| $Fe_2O_3$ | 0.50 | 0.50 | 0.50 | 0.60 | 0.70 | 0.65 | 0.80 | 0.60 | 0.60 | 0.60 | 0.58 | 0.60 |
| Si met. | 0.10 | 0.12 | 0.08 | 0.00 | 0.00 | 0.00 | 0.00 | 0.00 | 0.00 | 0.05 | 0.12 | 0.00 |
| SiO | 0.01 | 0.02 | 0.01 | 0.20 | 0.21 | 0.21 | 0.20 | 0.20 | 0.19 | 0.10 | 0.02 | 0.17 |
| Sucrose | 0.00 | 0.00 | 0.00 | 0.00 | 0.00 | 0.00 | 0.00 | 0.00 | 0.00 | 0.00 | 0.00 | 0.00 |
| $Er_2O_3$ | 2.00 | 2.00 | 0.50 | 2.00 | 1.70 | 1.75 | 2.00 | 1.70 | 1.50 | 1.50 | 1.70 | 2.00 |
| $TiO_2$ | 0.40 | 1.00 | 0.10 | 0.20 | 0.20 | 0.25 | 0.20 | 0.19 | 0.40 | 0.25 | 0.00 | 0.00 |
| Thickness | 4.1 mm | 4.1 mm | 4.1 mm | 4.1 mm | 4.1 mm | 4.1 mm | 4.1 mm | 4.1 mm | 4.1 mm | 4.1 mm | 4.1 mm | 4.1 mm |
| % Lta | 73.14 | 70.75 | 77.40 | 71.40 | 72.14 | 72.94 | 67.41 | 71.88 | 72.00 | 71.86 | 70.97 | 73.34 |
| % UV | 41.24 | 34.61 | 49.10 | 39.37 | 35.04 | 39.11 | 31.32 | 37.59 | 35.91 | 36.81 | 41.84 | 39.32 |
| % TS | 50.76 | 46.49 | 54.15 | 47.87 | 49.44 | 50.17 | 42.72 | 49.48 | 48.45 | 48.05 | 46.19 | 51.89 |
| % IR | 31.25 | 26.49 | 33.54 | 27.26 | 30.37 | 30.48 | 22.07 | 30.35 | 28.60 | 27.75 | 24.07 | 33.33 |
| wt.% FeO | 0.160 | 0.185 | 0.149 | 0.180 | 0.164 | 0.163 | 0.213 | 0.164 | 0.173 | 0.178 | 0.200 | 0.150 |
| % Ltc (Y) | 73.30 | 70.85 | 78.43 | 71.77 | 72.34 | 73.23 | 67.81 | 72.05 | 72.33 | 72.29 | 71.75 | 73.44 |
| x | 0.3077 | 0.311 | 0.3023 | 0.3055 | 0.3089 | 0.3074 | 0.3071 | 0.3087 | 0.3082 | 0.3067 | 0.3013 | 0.308 |
| y | 0.3111 | 0.3181 | 0.3153 | 0.3104 | 0.3152 | 0.3131 | 0.315 | 0.3141 | 0.3161 | 0.3143 | 0.3081 | 0.3107 |
| Dom. Wave. nm | 435.6 | 569.1 | 489.2 | 472.0 | 478.8 | 474.6 | 485.4 | 466.0 | 489.6 | 483.6 | 478.5 | 565.5 c |
| Ex. Purity | 1.69% | 0.73% | 2.97% | 2.38% | 0.55% | 1.38% | 1.23% | 0.81% | 0.74% | 1.46% | 4.11% | 1.85% |
| L* | 88.59 | 87.41 | 90.97 | 87.86 | 88.13 | 88.56 | 85.91 | 87.99 | 88.13 | 88.11 | 87.85 | 88.66 |
| a* | 1.26 | −0.44 | −3.43 | 0.56 | −0.11 | 0.14 | −0.85 | 0.31 | −0.90 | −0.77 | −0.41 | 1.59 |
| b* | −2.16 | 0.83 | −1.58 | −2.74 | −0.51 | −1.51 | −0.87 | −0.94 | −0.32 | −1.19 | −4.20 | −2.25 |

|  | Ex. 13 | Ex. 14 | Ex. 15 | Ex. 16 | Ex. 17 | Ex. 18 | Ex. 19 | Ex. 20 | Ex. 21 | Ex. 22 | Ex. 23 |
| --- | --- | --- | --- | --- | --- | --- | --- | --- | --- | --- | --- |
| Sand | 71.50 | 71.50 | 71.50 | 71.50 | 70.50 | 71.40 | 66.50 | 71.40 | 71.40 | 72.00 | 72.00 |
| Soda ash | 23.70 | 23.70 | 23.70 | 23.70 | 23.20 | 23.70 | 23.94 | 23.70 | 23.70 | 23.70 | 23.70 |
| Potash | 0.00 | 0.00 | 0.00 | 0.00 | 0.00 | 0.00 | 1.47 | 0.00 | 0.00 | 0.00 | 0.00 |
| Alumina | 0.00 | 0.00 | 0.00 | 0.00 | 0.00 | 0.00 | 2.00 | 0.00 | 0.00 | 0.00 | 0.00 |
| Dolomite | 18.32 | 18.32 | 18.32 | 18.32 | 18.32 | 18.32 | 0.00 | 18.32 | 18.32 | 18.32 | 18.32 |
| Limestone | 6.10 | 6.10 | 6.10 | 6.10 | 6.10 | 6.10 | 2.68 | 6.10 | 6.10 | 6.10 | 6.10 |
| Boric acid | 0.89 | 0.89 | 0.89 | 0.89 | 3.54 | 1.06 | 21.24 | 1.06 | 1.06 | 0.00 | 0.00 |
| Salt cake | 0.50 | 0.50 | 0.50 | 0.50 | 0.50 | 0.50 | 0.50 | 0.50 | 0.50 | 0.50 | 0.50 |
| $Fe_2O_3$ | 0.60 | 0.58 | 0.58 | 0.65 | 0.80 | 0.80 | 0.80 | 0.80 | 0.80 | 0.80 | 0.80 |
| Si met. | 0.10 | 0.12 | 0.12 | 0.08 | 0.10 | 0.00 | 0.05 | 0.00 | 0.00 | 0.00 | 0.00 |
| SiO | 0.02 | 0.02 | 0.02 | 0.01 | 0.05 | 0.00 | 0.30 | 0.30 | 0.30 | 0.30 | 0.30 |
| Sucrose | 0.00 | 0.00 | 0.00 | 0.00 | 0.00 | 0.20 | 0.00 | 0.00 | 0.00 | 0.00 | 0.00 |
| $Er_2O_3$ | 2.00 | 1.00 | 1.40 | 2.00 | 2.00 | 2.00 | 2.00 | 2.50 | 3.00 | 2.00 | 2.50 |
| $TiO_2$ | 0.00 | 0.00 | 0.00 | 0.00 | 0.05 | 0.11 | 0.05 | 0.08 | 0.00 | 0.00 | 0.10 |
| Thickness | 4.1 mm | 4.1 mm | 4.1 mm | 4.1 mm | 3.2 mm | 3.2 mm | 3.2 mm | 3.2 mm | 3.2 mm | 3.2 mm | 3.2 mm |
| % Lta | 70.35 | 72.61 | 71.57 | 70.59 | 70.47 | 71.23 | 73.26 | 70.62 | 71.21 | 72.00 | 71.31 |
| % UV | 40.88 | 39.52 | 43.44 | 39.60 | 37.57 | 40.35 | 34.37 | 38.97 | 35.67 | 40.97 | 38.85 |
| % TS | 45.88 | 48.40 | 46.30 | 46.41 | 45.79 | 46.90 | 51.12 | 46.85 | 49.26 | 48.82 | 48.50 |
| % IR | 24.10 | 27.52 | 23.62 | 25.00 | 24.09 | 25.41 | 31.33 | 25.95 | 30.56 | 28.40 | 28.61 |
| wt.% FeO | 0.199 | 0.179 | 0.203 | 0.194 | 0.250 | 0.245 | 0.206 | 0.240 | 0.208 | 0.222 | 0.221 |
| % Ltc (Y) | 71.00 | 73.45 | 72.51 | 71.14 | 71.20 | 71.89 | 73.40 | 71.09 | 71.24 | 72.51 | 71.59 |
| x | 0.3018 | 0.3031 | 0.3004 | 0.3033 | 0.3024 | 0.3033 | 0.3085 | 0.3044 | 0.3083 | 0.3049 | 0.3064 |
| y | 0.3068 | 0.314 | 0.3091 | 0.3084 | 0.3099 | 0.3108 | 0.313 | 0.3096 | 0.3101 | 0.3117 | 0.3105 |
| Dom. Wave. nm | 474.9 | 486.9 | 481.4 | 474.5 | 480.2 | 480.4 | 443.8 | 474.4 | 562.7 c | 479.4 | 466.3 |
| Ex. Purity | 4.12% | 2.80% | 4.32% | 3.41% | 3.52% | 3.08% | 1.08% | 2.86% | 2.16% | 2.41% | 2.11% |
| L* | 87.49 | 88.66 | 88.21 | 87.55 | 87.58 | 87.92 | 88.64 | 87.53 | 87.6 | 88.22 | 87.77 |
| a* | 0.47 | −2.39 | −1.36 | 0.44 | −0.79 | −0.74 | 0.74 | 0.38 | 2.04 | −0.40 | 0.88 |
| b* | −4.57 | −1.87 | −4.03 | −3.79 | −3.39 | −2.95 | −1.36 | −3.18 | −2.38 | −2.39 | −2.56 |

Once given the above disclosure many other features, modifications and improvements will become apparent to the skilled artisan. Such features, modifications and improvements are therefore considered to be a part of this invention, the scope of which is to be determined by the following claims:

We claim:

1. A glass having a colorant portion which includes, by weight percent:

| | |
|---|---|
| Fe$_2$O$_3$ (total iron) | about 0.5–0.8% |
| FeO | about 0.1–0.25% |
| Er$_2$O$_3$ | about 0.5–3.0% |
| TiO$_2$ | about 0.0–1.0% | wherein said glass is free of Se and wherein said glass when measured at a nominal thickness of about 1 mm–6 mm has a dominant wavelength of from about 435 nm to less than 570 nm and an excitation purity of less than about 4.5%.

2. A glass according to claim 1 wherein said glass is a soda-lime-silica glass and said colorant portion consists essentially of by weight percent:

| | |
|---|---|
| Fe$_2$O$_3$ (total iron) | about 0.5–0.8% |
| FeO | about 0.1–0.25% |
| Er$_2$O$_3$ | about 0.5–3.0% |
| TiO$_2$ | about 0.0–1.0%. |

3. A glass according to claim 2 wherein said dominant wavelength and excitation purity are measured at a nominal thickness of said glass of about 3 mm–4 mm.

4. A glass according to claim 1 wherein said glass is substantially free of cerium.

5. A glass according to claim 4 wherein said glass is substantially free of nickel.

6. A glass according to claim 5 wherein said glass is substantially free of cobalt.

7. A glass according to claim 1 wherein said glass includes by weight percent about 0.1–1.0% TiO$_2$.

8. A glass according to claim 1 wherein said glass further includes by weight percent about 0.25–1.0% B$_2$O$_3$.

9. A glass according to claim 1 or 8 wherein said glass has the following characteristics when measured at a nominal thickness of 4 mm:
   LTa: greater than or equal to about 70%
   UV: less than about 42%
   IR: less than about 37%.

10. A glass according to claim 9 wherein said:
   LTa is equal to or greater than about 70%
   UV is less than about 39%
   IR is less than about 28%, and
   T$_s$ is less than about 47%.

11. A glass according to claim 10, wherein said glass when measured at a nominal thickness of 3 mm–4 mm has a purity of about 0.2–4.5% and a dominant wavelength of 480 nm–550 nm.

12. A glass according to claim 1 wherein when measured at a nominal thickness of 4 mm, said glass has the following characteristics according to Ill. C, 2° observer, CIE:
   L* about 86–91
   a* about −2.4 to +1.6
   b* about −5.0 to +2.0.

13. A glass according to claim 12 wherein said characteristics according to Ill. C, 2° observer, CIE are:
   L* about 87–89
   a* about −0.5 to +1.0
   b* about −3.0 to −1.0.

14. A glass according to claim 1 wherein by weight percent said Fe$_2$O$_3$ is about 0.6–0.8%, said FeO is about 0.16–0.25%, and said Er$_2$O$_3$ is about 1.0–2.0%.

15. A glass according to claim 1 wherein said glass is formed from a batch mixture which includes about 0.01–0.3 weight percent SiO and about 0–0.12 weight percent metallic silicon.

16. A method of making the grey glass of claim 1 comprising the steps of:
   a) forming at least two separate prebatch mixes which when mixed together form an overall batch mixture comprising:
   Ingredient
   sand
   iron oxide
   erbium oxide
   SiO
wherein said first prebatch mix comprises:
   Ingredient
   iron oxide
   SiO
   sand
and wherein any remaining prebatch mix or mixes include the remaining ingredients in said overall batch mixture,
   b) mixing said first prebatch ingredients together separately from said remaining batch ingredients to form said first prebatch mix,
   c) mixing said remaining ingredients so as to form at least one other separate prebatch mix,
   d) mixing said prebatch mixes together to form said overall batch mixture,
   e) melting said overall batch mixture to form a glass therefrom, and thereafter
   f) forming said grey glass into a grey glass article.

17. A method according to claim 16 which includes the steps of:
   a) forming at least three separate prebatch mixes,
   b) separately mixing together the ingredients in each said prebatch mix and, thereafter
   c) mixing said at least three separate pre-mixed prebatch mixes to form said overall batch mixture, wherein one of said prebatch mixes comprises:
   Ingredient
   sand
   dolomite
   limestone
   boric acid
   salt cake
and wherein another of said prebatch mixes comprises:
   Ingredient
   soda ash
   titania
   erbium.

18. A method according to claim 16 wherein said glass is a grey glass automotive window which when measured at a nominal thickness of about 1 mm–6 mm, has a dominant wavelength of from about 435 nm to less than 570 nm, an excitation purity of less than about 4.5%, an LTa equal to or greater than about 70%, an IR transmittance less than about 28%, and a UV transmittance less than 42%.

19. A method according to claim 18 wherein said glass when said glass is measured at a nominal thickness of about 3 mm–4 mm the glass has a dominant wavelength of from about 480 mm to 550 mm, an excitation purity of about 0.2–4.3%, an Lta of greater than about 70%, a UV less than about 38%, an IR less than about 28%, and a T$_s$ less than about 47%.

20. A method according to claim 16 wherein said overall batch mixture further includes:

Ingredient
soda ash
dolomite
limestone
boric acid
salt cake.

21. A method according to claim 20 wherein said first prebatch mix consists essentially of:

Ingredient
iron oxide as rouge
metallic Si
SiO
sand.

22. A method according to claim 20 wherein said overall batch mixture further includes titania.

23. A grey glass composition comprising by weight percent:

| Ingredient | Wt. % |
|---|---|
| $SiO_2$ | about 65–75 |
| $Na_2O$ | about 0–15 |
| CaO | about 1.5–15 |
| MgO | about 0–10 |
| $Al_2O_3$ | about 0–3 |
| $K_2O$ | about 0.1–1 |
| [$So_3$]$SO_3$ | about 0.1–0.3 |
| $TiO_2$ | about 0–1.0 |
| $Fe_2O_3$ | about 0.50–0.80 |
| FeO | about 0.10–0.25 |
| $Er_2O_3$ | about 0.50–3.0 |
| $B_2O_3$ | about 0–12.0 | wherein said glass is free of Se, is grey in color and has a dominant wavelength of from about 435 nm to less than 570 nm when measured at a nominal thickness of 1 to 6 mm.

24. A grey glass composition according to claim 23, wherein said composition, by weight percent comprises:

| Ingredient | Wt. % |
|---|---|
| $TiO_2$ | 0.1–0.50 |
| $Fe_2O_3$ (total iron) | 0.55–0.80 |
| FeO | 0.16–0.25 |
| $Er_2O_3$ | 1.0–2.0 |

25. A grey glass composition according to claim 24 wherein said composition includes about 0.25–1.0% by weight $B_2O_3$.

26. A grey glass article formed of the composition of claim 24 wherein said glass article when measured at a nominal thickness of about 1 mm–6 mm, has a dominant wavelength of from about 435 nm to less than 570 nm and an excitation purity of less than about 4.5%.

27. A grey glass article formed of the composition of claim 25 wherein said glass article when measured at a nominal thickness of about 1 mm–6 mm, has a dominant wavelength of 480–550 nm and an excitation purity of 0.2–4.5%.

28. A grey glass article according to claim 26 or 27 wherein said glass article is a component of an automotive window.

29. A grey glass article according to claim 26, or 27 wherein said glass article is a lens of an eyeglass or an architectural window.

30. A grey glass according to claim 23 wherein said glass is substantially free of Co.

31. A grey glass according to claim 23 wherein said glass is substantially free of Ni.

32. A grey glass according to claim 23 wherein said glass is substantially free of Ce.

33. A grey glass according to claim 23 wherein said glass is substantially free of Co, Ni, and Ce.

* * * * *